(12) United States Patent
Winiarski et al.

(10) Patent No.: US 11,090,763 B2
(45) Date of Patent: Aug. 17, 2021

(54) BUILD MATERIAL APPLICATION DEVICE FOR AN APPARATUS FOR ADDITIVELY MANUFACTURING THREE-DIMENSIONAL COMPONENTS

(71) Applicant: CONCEPT LASER GMBH, Lichtenfels (DE)

(72) Inventors: Daniel Winiarski, Bad Staffelstein (DE); Jens Stammberger, Rödental (DE); Frank Pfister, Zapfendorf (DE); Alexander Hofmann, Weismain (DE)

(73) Assignee: CONCEPT LASER GMBH, Lichtenfels (DE)

( * ) Notice: Subject to any disclaimer, the term of this patent is extended or adjusted under 35 U.S.C. 154(b) by 197 days.

(21) Appl. No.: 16/134,829

(22) Filed: Sep. 18, 2018

(65) Prior Publication Data

US 2019/0118301 A1  Apr. 25, 2019

(30) Foreign Application Priority Data

Oct. 20, 2017  (EP) ..................................... 17197644

(51) Int. Cl.
*B23K 26/342* (2014.01)
*B33Y 10/00* (2015.01)
(Continued)

(52) U.S. Cl.
CPC ............ *B23K 26/342* (2015.10); *B22F 12/00* (2021.01); *B23K 26/1464* (2013.01);
(Continued)

(58) Field of Classification Search
CPC .. B23K 26/342; B23K 26/1464; B33Y 10/00; B33Y 30/00; B33Y 50/02; B29C 64/214;
(Continued)

(56) References Cited

U.S. PATENT DOCUMENTS 5,904,889 A     5/1999  Serbin et al.
2016/0052014 A1  2/2016  Halder et al.
(Continued)

FOREIGN PATENT DOCUMENTS

CN    103001916 A     3/2013
CN    104001916 A  *  8/2014
(Continued)

OTHER PUBLICATIONS

CN-104001916-A, Bai Yuchao et al., machine translation, Aug. 27, 2014. (Year: 2014).*
(Continued)

*Primary Examiner* — Joseph S Del Sole
*Assistant Examiner* — Lawrence D. Hohenbrink, Jr.
(74) *Attorney, Agent, or Firm* — Dority & Manning, P.A.

(57) ABSTRACT

Build material application device (6) for an apparatus (1) for additively manufacturing three-dimensional components by means of successive layerwise selective irradiation and consolidation of layers of a build material (3) which can be consolidated by means of an energy beam (4), the build material application device (6) being configured to apply a layer of build material (3) in a build plane (7) of a respective apparatus (1), the build material application (6) device comprising at least one build material application member (10, 11), wherein the at least one build material application member (10, 11) is at least partially additively manufactured by means of successive layerwise selective irradiation and consolidation of layers of a build material (3) which can be consolidated by means of an energy beam (4).

14 Claims, 3 Drawing Sheets

(51) Int. Cl.

| | |
|---|---|
| *B33Y 30/00* | (2015.01) |
| *B33Y 50/02* | (2015.01) |
| *B23K 26/14* | (2014.01) |
| *B29C 64/205* | (2017.01) |
| *B29C 64/393* | (2017.01) |
| *B28B 1/00* | (2006.01) |
| *B28B 17/00* | (2006.01) |
| *B29C 64/153* | (2017.01) |
| *B29C 64/268* | (2017.01) |
| *B29C 64/214* | (2017.01) |
| *B22F 12/00* | (2021.01) |
| *G05B 19/4099* | (2006.01) |
| *B22F 10/10* | (2021.01) |
| *B22F 10/00* | (2021.01) |

(52) U.S. Cl.
CPC .......... *B28B 1/001* (2013.01); *B28B 17/0081* (2013.01); *B29C 64/153* (2017.08); *B29C 64/205* (2017.08); *B29C 64/214* (2017.08); *B29C 64/268* (2017.08); *B29C 64/393* (2017.08); *B33Y 10/00* (2014.12); *B33Y 30/00* (2014.12); *B33Y 50/02* (2014.12); *B22F 10/00* (2021.01); *B22F 10/10* (2021.01); *G05B 19/4099* (2013.01)

(58) Field of Classification Search
CPC ... B29C 64/153; B29C 64/393; B29C 64/268; B29C 64/205; B22F 3/008; B22F 3/1055; B22F 2003/1056; B22F 2003/1057; B22F 2003/1058; B22F 10/00; B22F 10/10; B28B 1/001; B28B 17/0081; G05B 19/4099; Y02P 10/295

USPC ....................................................... 264/308
See application file for complete search history.

(56) References Cited

U.S. PATENT DOCUMENTS

| | | | | |
|---|---|---|---|---|
| 2017/0348771 | A1 | 12/2017 | Kawada et al. | |
| 2018/0210984 | A1* | 7/2018 | Herzog | .................. G06F 30/23 |
| 2019/0061237 | A1* | 2/2019 | Kimblad | ................. B22F 3/008 |

FOREIGN PATENT DOCUMENTS

| | | | | |
|---|---|---|---|---|
| DE | 102015112918 | A1 * | 2/2017 | ............ B22F 3/1055 |
| DE | 102015112918 | A1 | 2/2017 | |
| EP | 2818305 | A1 | 12/2014 | |
| JP | H09511709 | A | 11/1997 | |
| JP | 3136161 | B2 | 2/2001 | |
| JP | 2007/528810 | A | 10/2007 | |
| JP | 2015/038241 | A | 2/2015 | |
| JP | 6132962 | B1 | 5/2017 | |

OTHER PUBLICATIONS

European Search Opinion Corresponding to Application No. 17197644.2.

European Search Report Corresponding to Application No. 17197644 dated Apr. 19, 2018.

Japanese Office Action Corresponding to Application No. 2018110079 dated Jun. 25, 2019.

Chinese Search Report and Office Action Corresponding to Application No. 201711475335 dated Jun. 24, 2020.

Machine Translated Japanese Office Action Corresponding to Application No. 2019236317 dated Nov. 11, 2020.

* cited by examiner

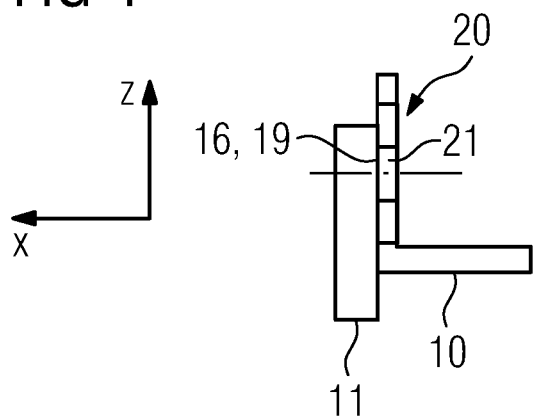
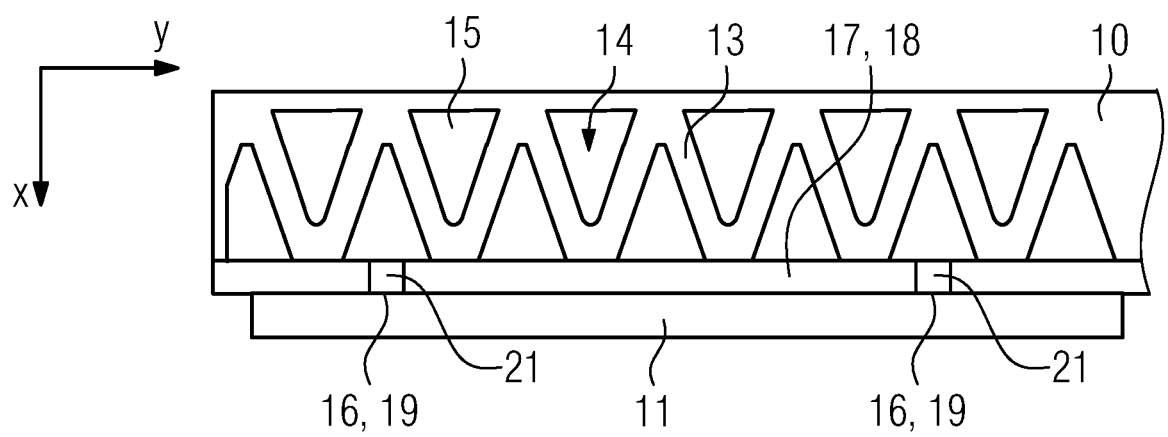

BUILD MATERIAL APPLICATION DEVICE FOR AN APPARATUS FOR ADDITIVELY MANUFACTURING THREE-DIMENSIONAL COMPONENTS

CROSS-REFERENCE TO RELATED APPLICATIONS

This application claims priority to European Patent Application serial no. 17 197 644.2 filed Oct. 20, 2017, the contents of which is incorporated herein by reference in its entirety as if set forth verbatim.

BACKGROUND

The invention relates to a build material application device for an apparatus for additively manufacturing three-dimensional components by means of successive layerwise selective irradiation and consolidation of layers of a build material which can be consolidated by means of an energy beam, the build material application device being configured to apply a layer of build material in a build plane of the apparatus, the build material application device comprising at least one build material application member.

Respective build material application devices for apparatuses for additively manufacturing three-dimensional components by means of successive layerwise selective irradiation and consolidation of layers of a build material which can be consolidated by means of an energy beam, are widely known. The main functionality of respective build material application devices is the layerwise application of build material in a build plane of the apparatus.

Respective build material application devices are typically standardized constructive assemblies which are manufactured by conventional manufacturing methods, e.g. by machining, i.e. by cutting, milling, etc., so that an individual manufacture of the build material application devices, e.g. under consideration of individually defined specifications is at least from an economic and/or manufacturing standpoint not reasonably feasible. Due to the fact that respective build material application devices are typically standardized assemblies, the properties of respective build material application are typically not optimized in view of given optimization criteria, e.g. inertia, motion behavior, stability, etc.

BRIEF SUMMARY

It is the objective of the invention to provide a build material application device with improved properties, in particular with properties which can be readily individually specified by a user.

This object is achieved by a build material application device for an apparatus for additively manufacturing three-dimensional objects according to independent claim 1. The dependent claims relate to possible embodiments of the build material application device according to independent claim 1.

The build material application device (hereinafter "application device") described herein is typically allocated to an apparatus (hereinafter "apparatus") for additively manufacturing three-dimensional components, e.g. technical parts, by means of successive layerwise selective irradiation and consolidation of layers of a, typically powdered, build material which can be consolidated by means of an energy beam, e. g. an electron beam or a laser beam. The application device is typically a functional and/or structural component of the apparatus.

The application device is configured to apply a layer of build material which is to be selectively irradiated and consolidated (during an additive manufacturing process) in the build plane, i.e. the plane in which the additive build-up of a component takes place by selectively irradiating and consolidating build material, of the apparatus. Applying a layer of build material in the build plane of the apparatus typically incorporates providing a layer of build material which is to be selectively irradiated and consolidated (during an additive manufacturing process) of given layer properties, e.g. given layer dimensions and/or given layer thickness, in the build plane of the apparatus.

The application device comprises at least one build material application member (hereinafter "application member"). The application member is a structural component of the application device. In the installed state, in which the application device is installed in the apparatus, the or at least one (further) application member is moveably supported relative to the build plane along at least one, typically, translatory motion axis, i.e. can be moved relative to the build plane, along at least one, typically, translatory motion axis, typically parallel to the build plane. By moving the application member along the at least one axis—the axis may be denoted or deemed as build material application axis or coating axis—relative to the build plane, a build material layer of given layer properties, e.g. given layer dimensions and/or given layer thickness, is applied to the build plane. Thus, the application device may be configured to apply a certain amount of build material to the build plane in layerwise manner. The thickness of the provided build material layer is mainly defined by the dimensions of a gap between the free end facing the build plane ("bottom end") of the application member and the surface of the build plane facing the application member.

In order to improve the properties of the application device compared to known build material application devices which are manufactured by conventional manufacturing methods, e.g. by machining, i.e. by cutting, milling, etc., the at least one application member of the application device is at least partially, if need be entirely, additively manufactured, i.e. manufactured in an additive manufacturing process by means of successive layerwise selective irradiation and consolidation of layers of a build material which can be consolidated by means of an energy beam. Thus, the or at least one application member of the application device, if need be all application members, of the application device is/are at least partially, if need be entirely, additively manufactured components. By additively manufacturing a respective application member, e.g. in a selective laser melting or a selective electron beam melting process, the application member is typically no standardized constructive assembly, but can be manufactured with essentially any individual geometric-constructive design, i.e. any defined and/or non-defined geometric shape, so that essentially any individually defined geometric-constructive specifications of the application member and the application device, respectively can be realized. In particular, since any geometric-constructive design can be realized, the constructive and functional properties of respective application members can be individually improved or optimized, respectively in view of diverse optimization criteria, e.g. inertia, motion behavior, stability, weight, etc.

Due to the wide varieties of different geometric-constructive designs of the application device, the application device, i.e. at least the at least one additively manufactured application member, can generally comprise any spatial shape/design, i.e. can generally extend in any spatial direction. The application member can particularly be manufactured with any cross-sectional geometry, i.e. may be provided with diverse apertures, openings, surface structures, different wall thicknesses, etc.

The spatial shape/design of the additively manufactured application member may have at least one technical function, e.g. (local) increase of mechanical stability, density, weight, etc. and/or (local) decrease of mechanical stability, density, weight, etc. In other words, an application member may comprise additively manufactured functional structures such as light-weight framing structures, e.g. angled webs, for reducing the weight, attachment structures, e.g. holding receptacles, for attaching a further application member, stiffening structures, e.g. ribs, for stiffening the application member, etc.

The at least partial additive manufacture of the application device may also reduce the number of total members of the application device since one (single) application member may have be provided with different functionalities. The reduced number of total members of the application device also reduces the effort and time of assembling the application device. It is conceivable that the application device may comprise only one application member having provided with all functionalities of the application device.

Hence, an application device with improved properties, in particular with properties which can be readily individually specified by a user, is given.

The application device may comprise a plurality, i.e. at least two, application members (mechanically) attachable/connectable or attached/connected to/with each other, wherein at least one application member is at least partially additively manufactured by means of successive layerwise selective irradiation and consolidation of layers of a build material which can be consolidated by means of an energy beam. Hence, the application device may comprise non-additively manufactured application members combined with additively manufactured application members which may have advantages in terms of the manufacture of the application device since application members which do not necessarily require additive manufacturing may be standardized, i.e. can be manufactured by conventional methods such as machining; yet, application members which require additive manufacturing in view of individually given specifications, optimization criteria, etc. can be additively manufactured.

The at least partially additively manufactured application member may comprise a streaming channel structure, i.e. particularly an integrated or internal streaming channel structure, having at least one streaming channel being at least partially additively manufactured. A respective streaming channel is defined by the surrounding selectively irradiated and consolidated material or wall portions of the additively manufactured application member and hence, may generally be built with any (cross-sectional) geometry. The streaming channel structure may comprise a number of separate streaming channels which may communicate with each other and thus, may form a network-like streaming channel structure. The spatial extension of a respective streaming channel structure, i.e. the course of the streaming channel(s) through/within the application member may generally, be arbitrarily chosen. The spatial extension of the streaming channel structure, i.e. the course of the streaming channel(s) through/within the application member, may be optimized in view of diverse optimization criteria, e.g. an optimized, e.g. laminar streaming of the streaming fluid, e.g. a gas, through the streaming channel. As will be apparent, the streaming fluid may stream as a sucking or suction stream, i.e. may be a sucking or suction stream.

The at least one streaming channel typically extends between at least one streaming channel inlet and at least one streaming channel outlet provided with the application member. As mentioned before, the spatial extension of the streaming channel structure may be arbitrarily chosen. Yet, the spatial extension of the streaming channel is typically defined by the geometric-constructive design of the application member. As an example, a streaming channel may extend between the streaming channel inlet and the streaming channel outlet in a meander-like shape.

The streaming channel structure may form part of a pneumatic attaching device provided with the application device, the pneumatic attaching device being configured to pneumatically (detachably) attach at least one further application member to the application member provided with the streaming channel structure. Hence, at least two application members may be attached/connected to/with each other by means of the pneumatic attaching device. The pneumatic attachment/connection is realized by a suction (gas) stream generated by a suction stream generating device, e.g. a pump device, communicating with the streaming channel inlet, the suction stream streaming through the streaming channel structure creating a suction force at a respective streaming channel outlet, the suction force being capable of holding an application member disposed in front of the streaming channel outlet securely in place. Hence, a streaming channel outlet serves as an attachment portion of an attachment structure of the application member.

The streaming channel structure may also form part of a pneumatically actuable attaching device configured to attach at least one further build material application member to the application member provided with the streaming channel structure. A respective pneumatically actuable attaching device typically comprises at least one pneumatically actuable attachment element. A respective pneumatically actuable attachment element may be provided with the application member or the further application member which is to be attached to the application member. A respective pneumatically actuable attachment element may comprise two different operational states, i.e. an attaching state, in which an attachment of at least one further application member to the application member is possible, and a non-attaching state, in which an attachment of at least one further application member to the application member is not possible. As such, the pneumatically actuable attachment element may be built as or comprise a be a clamping element comprising two different clamping states, i.e. e. a clamping state (attaching state), in which an clamped attachment of at least one further application member to the application member is possible, and a non-clamping state (non-attaching state), in which a clamped attachment of at least one further application member to the application member is not possible. The pneumatically actuable attachment/connection may be realized by a (pressurized) blowing (gas) stream generated by a blowing stream generating device (not shown), e.g. a pump device, communicating with the streaming channel inlet, the blowing stream streaming through the streaming channel structure creating a force at the streaming channel outlets which transfers and holds the pneumatically actuable attachment element provided in the region of the streaming channel outlets in the attaching state.

It was mentioned above that the properties of a respective application member can be individually improved or optimized, respectively in view of diverse optimization criteria, e.g. inertia, motion behavior, stability, weight, etc. Thus, the at least one application member may at least partially comprise a geometric-constructive design derived from a simulated model, in particular a computer-simulated FEM-model, of the application member, the simulated model being generated on basis of at least one pre-defined optimization criterion. An optimization criterion may refer to specific physical properties, in particular mechanical properties, e.g. stiffness, density properties, weight properties, or a specific, e.g. gradual, distribution of respective physical properties of the at least one application member and the application device, respectively. The simulated model may consider/simulate diverse operational conditions, e.g. load and/or thermal conditions, of the application member or application device, respectively and simulate the behavior of the application member or application device, respectively under the diverse operational conditions. The simulated model may (also) reflect pre-defined optimization criteria under diverse operational conditions, i.e. an optimized mechanical stability under a given temperature. The simulated model may directly form basis for the build data used for additively manufacturing the application member and the application device, respectively. Thus, the actual geometric-constructive design of the application member may be derived from the simulated model and thus, takes into account the simulated model resulting in optimized properties of the application member and the application device, respectively. The simulated model may be a topology optimized simulated model, for instance. Thus, the at least one application member may at least partially comprise a geometric-constructive design derived from a topology optimized simulated model. It is also possible that the at least one application member at least partially comprises a bionic geometric-constructive design derived from a simulated model, in particular a computer-simulated FEM-model, of the application member or the application device, the simulated model being generated on basis of at least one pre-defined optimization criterion, e.g. an optimization criterion as mentioned before.

The at least one additively manufactured application member may be a carrier or support member configured to carry or support at least one further application member, e.g. a coater blade member, or a detection or measuring member, e.g. a sensor, such as a camera, configured to detect or measure at least one chemical and/or physical detection quantity. As such, the application member may have a longitudinal geometric-constructive design. The application member may have a L-shaped cross-section. Of course, other cross-sectional shapes are conceivable, this particularly applies to the case in which the application member at least partially comprises a geometric-constructive design, e.g. a bionic design, derived from a topology optimized simulated model.

The invention further relates to an apparatus for additively manufacturing three-dimensional components, e.g. technical parts, by means of successive layerwise selective irradiation and consolidation of layers of a build material which can be consolidated by means of an energy beam. A respective build material can be a metal, ceramic or polymer powder. A respective energy beam can be a laser beam or an electronic beam. A respective apparatus can be a selective laser sintering apparatus, a selective laser melting apparatus or a selective electron beam melting apparatus, for instance. Alternatively, the successive layerwise selective consolidation of build material may be performed via at least one binding material. The binding material may be applied with a corresponding application unit and, for example, irradiated with a suitable energy source, e.g. a UV light source.

The apparatus comprises a number of structural and/or functional devices. Exemplary structural and/or functional devices are a process chamber comprising a build plane in which layers of build material are successively layerwise selectively irradiated and consolidated by means of an energy beam during operation of the apparatus, an irradiating device which is configured to selectively irradiate a build material layer disposed in the process chamber with at least one energy beam, a build material application device which is configured to apply a layer of build material in the build plane of the apparatus, and a gas stream generating device, which may be built as or may comprise a sucking and/or blowing device, which is configured to generate a gas stream at least partly streaming through the process chamber. The gas stream is capable of being charged with non-consolidated build material particles, particularly smoke or smoke residues generated during operation of the apparatus, while streaming through the process chamber.

The apparatus comprises at least one application device as specified herein. In other words, the application device being a functional component of the apparatus is an additively component itself. All annotations concerning the application device also apply to the apparatus in analogous manner.

The invention further relates to a method for additively manufacturing an application member of an application device or an application device for an apparatus for additively manufacturing three-dimensional components, comprising the steps of:
  providing build data concerning the build material application member or build material application device to be manufactured,
  additively manufacturing the build material application member or build material application device by means of successive layerwise selective irradiation and consolidation of layers of a build material which can be consolidated by means of an energy beam.

The method may be implemented as a selective laser melting method or as a selective electron beam melting method, for instance. All annotations concerning the application device also apply to the method in analogous manner.

The provided build data may specify a geometric-constructive design of the application member or application device, respectively derived from a simulated model, in particular a computer-simulated FEM-model, of the application member or application device, respectively, the simulated model being generated on basis of at least one pre-defined optimization criterion. The simulated model may be a topology optimized simulated model, for instance. Thus, the at least one application member may at least partially comprise a geometric-constructive design derived from a topology optimized simulated model. The respective annotations in context with the application device apply in analogous manner.

The invention also relates to a non-transitory computer readable storage medium storing code representative of a build material application member for a build material device, the build material application member physically generated upon execution of the code by a computerized additive manufacturing apparatus, the code comprising code representing the build material application member. The non-transitory computer readable storage medium storing code, the code further comprising at least one streaming channel structure extending through the build material device having at least one streaming channel being at least partially additively manufactured. The respective annotations in context with the application device or method apply in analogous manner.

BRIEF DESCRIPTION OF THE DRAWINGS

Exemplary embodiments of the invention are described with reference to the Fig., whereby

FIGS. 2-5 each show a principle drawing of an application device according to an exemplary embodiment.

DETAILED DESCRIPTION

Figure 1:
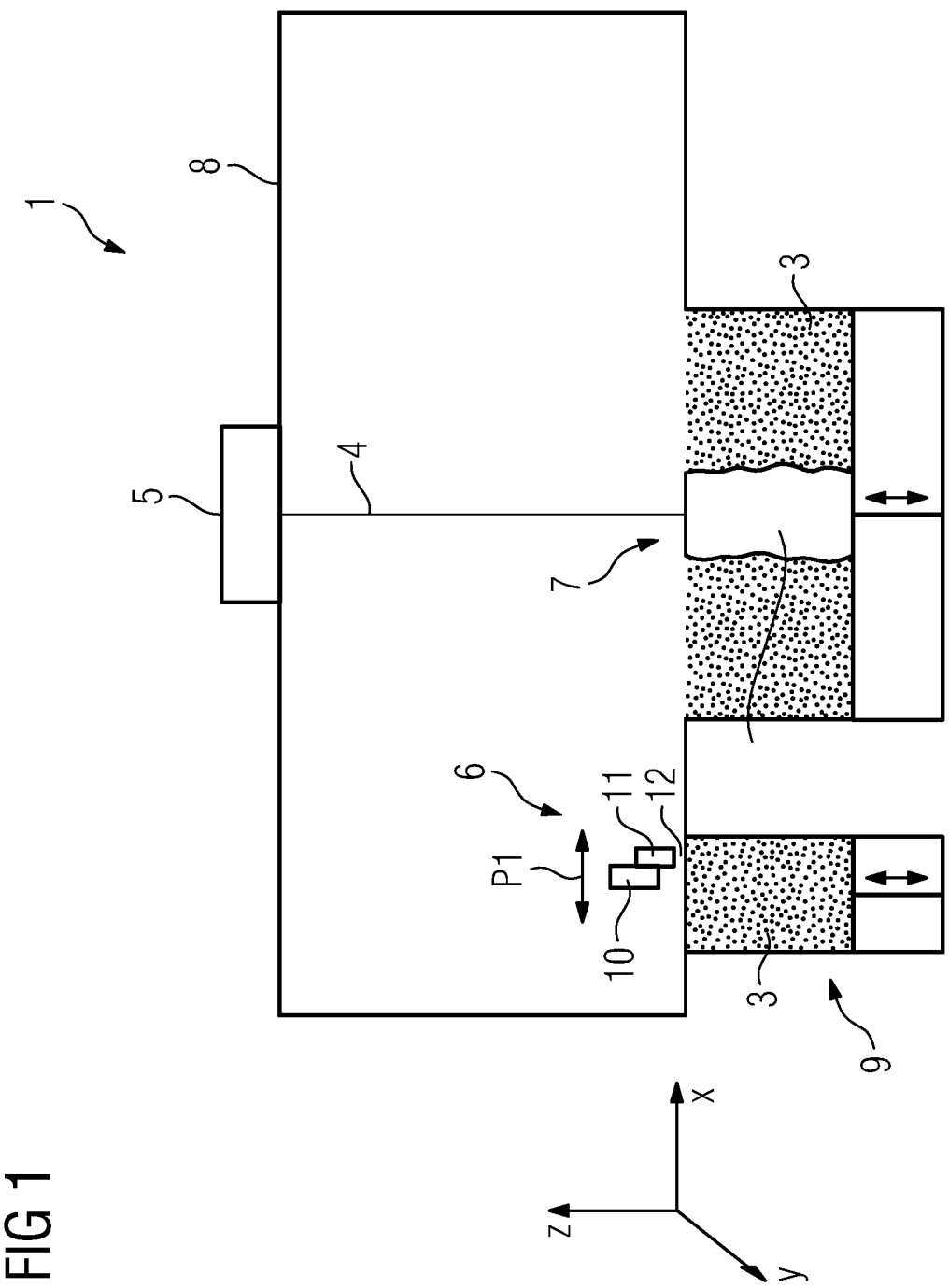
FIG. 1 shows a principle drawing of an apparatus for additively manufacturing three-dimensional objects according to an exemplary embodiment.

FIG. 1 shows a principle drawing of an apparatus 1 for additively manufacturing three-dimensional objects 2, e.g. technical parts, by means of successive layerwise selective irradiation and accompanying consolidation of layers of a powdered build material 3, e.g. a metal powder, which can be consolidated by means of an energy beam 4, e.g. a laser beam or an electron beam. The apparatus 1 can be a selective laser melting apparatus or a selective electron beam melting apparatus, for instance.

The apparatus 1 comprises a number of structural and/or functional devices.

One exemplary functional device is an irradiation device 5, particularly an energy beam generating device and/or an energy beam deflecting device, e.g. a scanning device, which serves for selectively irradiating build material layers with at least one energy beam 4.

Another exemplary functional device is a build material application device 6 ("application device"), particularly a coating device, serving for applying a layer of build material 3 provided from a dose module 9 of the apparatus 1 in a build plane 7 within a process chamber 8 of the apparatus 1.

Other exemplary functional devices, such as a stream generating device, e.g. a sucking and/or blowing device, which is configured to generate an inert gas stream capable of being charged with non-consolidated build material particles, particularly smoke or smoke residues generated during operation of the apparatus 1, while streaming through the process chamber 8, i.e. between a process chamber gas inlet (not shown) and a process chamber gas outlet (not shown), are not depicted.

Figure 2:
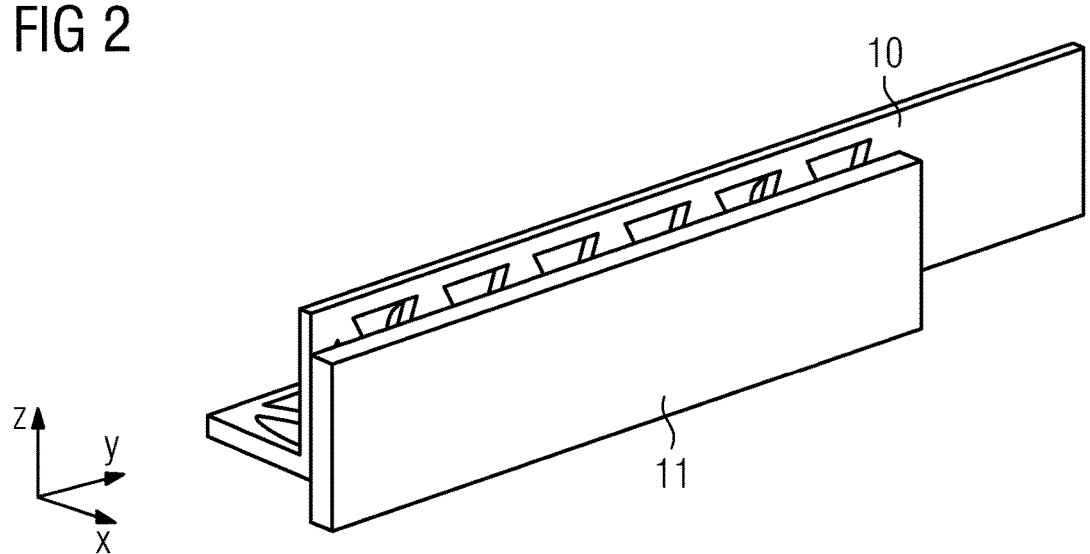
Figure 3:
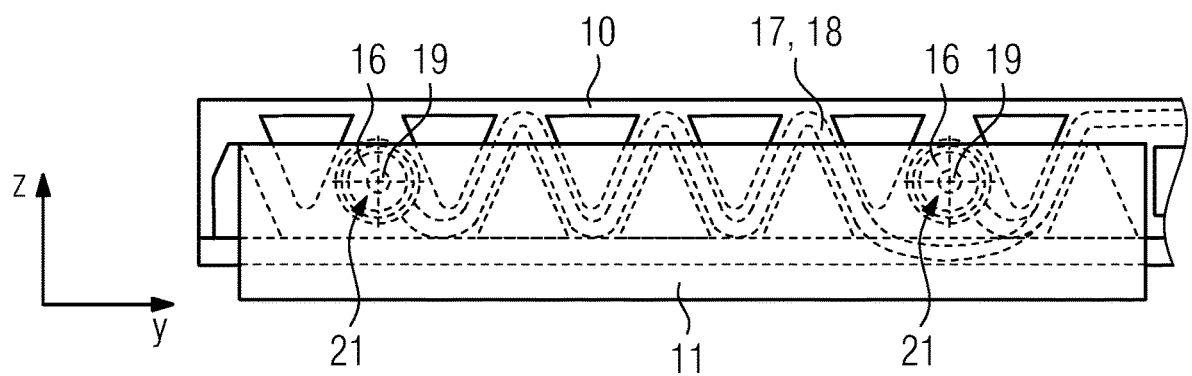

FIG. 2-5 each show a principle drawing of an application device 6 according to an exemplary embodiment; FIG. 2 shows a perspective view of the application device 6, FIG. 3 shows a frontal- or side-view of the application device 6, FIG. 4 shows a cross-sectionally cut-view of the application device 6, and FIG. 5 shows a top-view of the application device 6.

As mentioned before, the application device 6 is configured to apply a layer of build material 3 which is to be selectively irradiated and consolidated during an additive manufacturing process in the build plane 7 of the apparatus 1. Applying a layer of build material 3 in the build plane 7 of the apparatus 1 incorporates providing a layer of build material 3 of given layer properties, e.g. given layer dimensions and/or given layer thickness, in the build plane 7 of the apparatus 1.

The application device 6 comprises a plurality of build material application members 10, 11 ("application member"). A first application member 10 is a longitudinal carrier or support member ("support member") configured to carry or support at least one further application member 11, the further application member 11 is a coater blade member. Yet, The further application member 11 could also be a detection or measuring member (not shown), e.g. a sensor, such as a camera, configured to detect or measure at least one chemical and/or physical detection quantity. According to the exemplary embodiment of the Fig., the first application member 10 has a longitudinal geometric-constructive design and a L-shaped cross-section. Yet, other cross-sectional shapes are conceivable, this particularly applies to the case in which the application member 10 at least partially comprises a geometric-constructive design, e.g. a bionic design, derived from a topology optimized simulated model.

The support member is a structural component of the application device 6. In the installed state (see FIG. 1), in which the application device 6 is installed in the apparatus 1, the support member is moveably supported relative to the build plane 7 along at least one motion axis indicated by double-arrow P1, i.e. can be moved relative to the build plane 7, along at least one motion axis parallel to the build plane 7. By moving the support member 7 along the at least one axis—the axis may be denoted or deemed as build material application axis or coating axis—relative to the build plane 7, a build material layer of given layer properties, e.g. given layer dimensions and/or given layer thickness, is applied to the build plane 7. The thickness of the provided build material layer is defined by the dimensions of a gap 12 between the free end facing the build plane 7 ("bottom end") of the support member and the surface of the build plane 7 facing the support member.

The support member, if need be also further application members, of the application device 6 is additively manufactured, i.e. manufactured in an additive manufacturing process by means of successive layerwise selective irradiation and consolidation of layers of a build material 3 which can be consolidated by means of an energy beam 4. Thus, the support member of the application device 6 is an additively manufactured component. By additively manufacturing the support member, e.g. in a selective laser melting or a selective electron beam melting process, the support member is typically no standardized constructive assembly, but can be manufactured with essentially any individual geometric-constructive design, i.e. any defined and/or non-defined geometric shape, so that essentially any individually defined geometric-constructive specifications of the support member and the application device 6, respectively can be realized. In particular, since any geometric-constructive design can be realized, the constructive and functional properties of respective application members can be individually improved or optimized, respectively in view of diverse optimization criteria, e.g. inertia, motion behavior, stability, weight, etc.

Due to the wide varieties of different geometric-constructive designs of the support member and the application device 6, respectively, the application device 6 can generally comprise any spatial shape/design, i.e. can generally extend in any spatial direction. The support member can particularly be manufactured with any cross-sectional geometry, i.e. may be provided with diverse apertures, openings, surface structures, different wall thicknesses, etc.

The spatial shape/design of the additively manufactured support member may have at least one technical function, e.g. (local) increase of mechanical stability, density, weight, etc. and/or (local) decrease of mechanical stability, density, weight, etc. In other words, the support member may comprise additively manufactured functional structures such as light-weight framing structures 14, e.g. angled webs 13, apertures 15, etc., for reducing weight, attachment structures 16 for attaching a further application member, i.e. the coater blade member, stiffening structures (not shown), e.g. ribs, for stiffening the support member, etc.

As is apparent from the above, the application device 6 may comprise a plurality, i.e. at least two, application members 10, 11 (mechanically) attachable/connectable or attached/connected to/with each other. At least one application member 10, 11, i.e. the support member, is additively manufactured. Hence, the coater blade member is not necessarily additively manufactured; yet the coater blade member may also be additively manufactured.

The support member comprises a streaming channel structure 17 having a streaming channel. The streaming channel 18 is defined by the surrounding selectively irradiated and consolidated material or wall portions of the additively manufactured support member and hence, may generally be built with any (cross-sectional) geometry. The spatial extension of the streaming channel structure 17, i.e. the course of the streaming channel 18 through/within the support member may generally, be arbitrarily chosen. The spatial extension of the streaming channel structure 17, i.e. the course of the streaming channel 18 through/within the application member 6, may be optimized in view of diverse optimization criteria, e.g. an optimized, e.g. laminar streaming of the streaming fluid, e.g. a gas, through the streaming channel 18.

In the Fig., the streaming channel structure 17 and the streaming channel 18, respectively longitudinally extends in meander-like manner in direction of the longitudinal extension of the support member between a streaming channel inlet (not shown) and at least one streaming channel outlet 19 provided with the support member (see particularly FIG. 3). The streaming channel inlet is typically, provided opposite to the streaming channel outlet 19.

The streaming channel structure 17 forms part of a pneumatically actuable attaching device 20 configured to attach the coater blade member to the support member. The pneumatically actuable attaching device 20 comprises at least one pneumatically actuable attachment element 21. A respective pneumatically actuable attachment element 21 may be provided with the support member or the further coater blade member which is to be attached to the support member. A respective pneumatically actuable attaching element 21 may be built as or comprise a clamping element comprising two different clamping states, i.e. e. a clamping state (attaching state), in which an clamped attachment of the coater blade member to the support member is possible, and a non-clamping state (non-attaching state), in which a clamped attachment of the coater blade member to the support member is not possible. The pneumatically actuable attachment/connection is realized by a blowing (gas) stream generated by a pressurized blowing stream generating device (not shown), e.g. a pump device, communicating with the streaming channel inlet, the blowing stream streaming through the streaming channel structure 17 creating a force at the streaming channel outlets 19 which transfers and holds the clamping element provided in the region of the streaming channel outlets 19 in the clamping state.

In an additional or alternative embodiment, the streaming channel structure 17 may form part of a pneumatic attaching device integrally provided with the application device 6, the pneumatic attaching device being configured to pneumatically (detachably) attach at least one further application member, i.e. the coater blade member, to the support member. The pneumatic attachment/connection is realized by a suction (gas) stream generated by a suction stream generating device (not shown), e.g. a pump device, communicating with the streaming channel inlet, the suction stream streaming through the streaming channel structure 17 creating a suction force at the streaming channel outlets 19, the suction force being capable of holding the coater blade member disposed in front of the streaming channel outlets 19 securely in place. Hence, the streaming channel outlets 19 serve as an attachment portion of the attachment structure 16 of the support member.

Although not depicted in the Fig., the streaming channel structure 17 may comprise a number of separate streaming channels 18 which may communicate with each other and thus, may form a network-like streaming channel structure.

It was mentioned above that the properties of a respective application member can be individually improved or optimized, respectively in view of diverse optimization criteria, e.g. inertia, motion behavior, stability, weight, etc. Thus, the support member may at least partially comprise a geometric-constructive design derived from a simulated model, in particular a computer-simulated FEM-model, of the support member, the simulated model being generated on basis of at least one pre-defined optimization criterion. An optimization criterion may refer to specific physical properties, in particular mechanical properties, e.g. stiffness, density properties, weight properties, or a specific, e.g. gradual, distribution of respective physical properties of the support member and the application device 6, respectively. The simulated model may consider/simulate diverse operational conditions, e.g. load and/or thermal conditions, of the support member or application device 6, respectively and simulate the behavior of the support member or application device 6, respectively under the diverse operational conditions. The simulated model may (also) reflect pre-defined optimization criteria under diverse operational conditions, i.e. an optimized mechanical stability under a given temperature. The simulated model may directly form basis for the build data used for additively manufacturing the support member and the application device 6, respectively. Thus, the actual geometric-constructive design of the support member may be derived from the simulated model and thus, takes into account the simulated model resulting in optimized properties of the support member and the application device 6, respectively.

A respective additively manufactured application member of the application device, 6, e.g. the support member of FIG. 1-5, may be manufactured by a method for additively manufacturing an application member for an application device 6 or an application device 6 for an apparatus 1 for additively manufacturing three-dimensional components. The method comprises the steps of:
  providing build data concerning the application device 6 to be additively manufactured or at least one application member of the application device 6 to be additively manufactured,
  additively manufacturing the application device 6 or at least one build material application member of the application device 6 by means of successive layerwise selective irradiation and consolidation of layers of a build material 3 which can be consolidated by means of an energy beam 4.

The provided build data may specify a geometric-constructive design of the member or application device 6, respectively derived from a simulated model, in particular a computer-simulated FEM-model, of the application member 10 or application device 6, respectively, the simulated model being generated on basis of at least one pre-defined optimization criterion. The simulated model may be a topology optimized simulated model. Thus, the application member 10 may at least partially comprise a geometric-constructive design derived from a topology optimized simulated model. It is also possible that the application member 10 comprises a bionic geometric-constructive design derived from a simulated model, in particular a computer-simulated FEM-model, of the application member 10 or the application device 6.

The method may be implemented as a selective laser melting method or as a selective electron beam melting method, for instance.

The invention claimed is:

1. A method for manufacturing a build material application member of a build material application device or a build material application device for an apparatus for additively manufacturing three-dimensional components, the method comprising:
   providing build data concerning a build material application member or a build material application device to be manufactured,
   additively manufacturing the build material application member or the build material application device by successive layerwise selective irradiation and consolidation of layers of a build material which can be consolidated with an energy beam; and
   additively manufacturing at least one portion of a streaming channel of the build material application member or the build material application device based on at least one optimization criterion, wherein the streaming channel is configured for laminar streaming and extends longitudinally in a meander-like manner between a streaming channel inlet and at least one streaming channel outlet provided with the build material application member or the build material application device.

2. The method according to claim 1, wherein the build data specify a geometric-constructive design of the build material application member or the build material application device, respectively derived from a simulated model, of the build material application member or application device, respectively, the simulated model being generated on basis of at least one pre-defined optimization criterion.

3. The method according to claim 1, further comprising:
   forming a pneumatic attaching device at least in part with the streaming channel structure.

4. The method according to claim 3, further comprising:
   pneumatically attaching at least one further build material application member to the build material application member provided with the streaming channel structure.

5. A build material application device for an apparatus for additively manufacturing three-dimensional components by successive layerwise selective irradiation and consolidation of layers of a build material which can be consolidated with an energy beam the build material application device being configured to apply a layer of build material in a build plane of a respective apparatus, the build material application device comprising:
   at least one build material application member;
   a streaming channel structure of the at least one build material application member, the streaming channel structure comprising at least one streaming channel configured for laminar streaming and extending longitudinally in a meander-like manner between a streaming channel inlet and at least one streaming channel outlet provided with the build material application member; and
   a pneumatic attaching device formed at least in part by the streaming channel structure and configured to pneumatically attach at least one further build material application member to the at least one streaming channel outlet of the build material application member provided with the streaming channel structure, wherein the at least one streaming channel is at least partially additively manufactured.

6. The build material application device according to claim 5, wherein the build material application device comprises at least two build material application members attachable or attached to each other, wherein at least one build material application member is at least partially additively manufactured by successive layerwise selective irradiation and consolidation of layers of a build material which can be consolidated with an energy beam.

7. The build material application device according to claim 1, wherein the streaming channel structure forms part of the pneumatically attaching device configured to attach the at least one further build material application member to the build material application member provided with the streaming channel structure.

8. The build material application device according to claim 1, wherein the at least one build material application member at least partially comprises a geometric-constructive design derived from a simulated model, of the build material application member or the build material application device, the simulated model being generated on basis of at least one pre-defined optimization criterion.

9. The build material application device according to claim 8, wherein the at least one build material application member at least partially comprises a geometric-constructive design derived from a topology optimized simulated model.

10. The build material application device according to claim 1, wherein the at least one build material application member at least partially comprises a bionic geometric constructive design derived from a simulated model of the build material application member or the build material application device, the simulated model being generated on basis of at least one pre-defined optimization criterion.

11. The build material application device according to claim 1, wherein the at least one build material application member is a support member configured to support at least one further build material application member, or to support a detection member configured to detect at least one chemical and/or physical detection quantity.

12. An apparatus for additively manufacturing three-dimensional components by successive layerwise selective irradiation and consolidation of layers of a build material which can be consolidated with an energy beam, the apparatus comprising at least one build material application device according to claim 1.

13. A non-transitory computer readable storage medium storing code representative of:
   a build material application member for a build material application device, the build material application member physically generated upon execution of the code by a computerized additive manufacturing apparatus, the code comprising code representing the build material application member; and
   at least one streaming channel structure extending through the build material application device having at least one streaming channel being at least partially additively manufactured, wherein the streaming channel is configured for laminar streaming and extends longitudinally in a meander-like manner between a streaming channel inlet and at least one streaming channel outlet provided with the build material application member.

14. The non-transitory computer readable storage medium according to claim 13, wherein the code further comprises:

a pneumatic attaching device formed at least in part by the streaming channel structure and configured to pneumatically attach at least one further build material application member to the build material application member provided with the streaming channel structure.

\* \* \* \* \*